United States Patent [19]

Gluck

[11] 4,027,767

[45] June 7, 1977

[54] INDEXING MACHINE TRANSFER MECHANISM

[76] Inventor: William Gluck, P.O. Box 336, Monroeville, Pa. 15146

[22] Filed: July 24, 1975

[21] Appl. No.: 598,623

Related U.S. Application Data

[63] Continuation of Ser. No. 456,819, April 1, 1974, abandoned.

[52] U.S. Cl. ............................... 198/339; 198/488; 214/1 BB; 269/57
[51] Int. Cl.² ........................................... B23Q 7/02
[58] Field of Search ............. 198/19, 209, 210, 24, 198/20 R, 339, 488; 219/159; 269/56, 57; 214/1 B, 1 BB, 1 BC

[56] References Cited

UNITED STATES PATENTS

| | | | |
|---|---|---|---|
| 1,361,883 | 12/1920 | Littman | 269/209 X |
| 2,888,131 | 5/1959 | Allen | 198/210 |
| 3,062,362 | 11/1962 | Erkelens et al. | 198/209 |
| 3,175,702 | 3/1975 | Banyas | 198/210 X |

*Primary Examiner*—L. J. Paperner
*Attorney, Agent, or Firm*—Buell, Blenko & Ziesenheim

[57] ABSTRACT

Pick-and-place devices above a worktable which transfer small articles to work stations on the worktable from beyond its periphery are carried and actuated by mechanism within the periphery of the worktable operatively connected with a drive mechanism. Mechanism for projecting the devices beyond the periphery of the table and other mechanism for oscillating the devices above the table combined with the pick-and-place action to transfer the workpieces.

7 Claims, 5 Drawing Figures

INDEXING MACHINE TRANSFER MECHANISM

This application is a continuation of application Ser. No. 456,819, filed Apr. 1, 1974, and now abandoned.

This invention relates to indexing machines which pick up articles and then perform various mechanical operations on them at work stations on a worktable. More particularly, this invention relates to an improvement in such indexing tables which combines several independent movements at one point to effect a simple, safe and versatile composite movement of a "pick-and-place" head or the like.

A common type of assembly apparatus for performing various mechanical operations on articles involves an indexing machine having a worktable on which at several work stations the several mechanical operations are performed. A feeding mechanism adjacent the periphery of the indexing machine delivers an article to the first work station and the rotatable worktable advances the article around to the work stations around the worktable. Bowes et al. U.S. Pat. No. 3,024,184, generally depicts such an assembly used to electrophoretically coat wire coils. Bowes, however, chooses to rotate a turret holding the wire coils rather than to rotate the worktable. Other shaped articles require more elaborate feeding devices. Commercial pick-and-place devices are available as separate machines which are placed adjacent the indexing machine beyond the perimeter of the worktable. A production layout using such an assemblage is often complex and wasteful of floorspace and also presents the danger of moving machine parts to the people who operate and maintain the equipment.

I have invented in an improved arrangement for picking up and placing articles on the worktable of an indexing machine. I provide within the periphery of the worktable a transfer means, being any suitable device for picking up and placing the articles, carried by a support means which imparts to the transfer means a reciprocating movement toward and away from the top of the worktable, and projected by a projection means which imparts to the transfer means an oscillating movement between the article pick-up point beyond the periphery of the worktable and the work station on the table. The pick-and-place device is operatively connected to a power means below the level of the worktable. Thus I provide apparatus wherein all moving parts associated with the transfer means are in front of the operator where he can see them. Accordingly, the transfer means is carried, reciprocated and oscillated by moving parts which penetrate the plane of the worktable through a hole in the worktable in direct view of the operator rather than moving from beyond the periphery of the table and the operator's vision. Also, this machine and associated equipment are mechanically simpler, less costly, and use less floor space than do the conventional machines and floor layouts. My invention is particularly useful on complex machines having several transfer means because all of the pick-and-place devices may be actuated by the same support means and projection means.

Preferably, I provide for the reciprocal motion of the transfer means by reciprocating a carrier holding the transfer means through a first barrel cam located below the table. I also prefer to provide for the oscillatory motion of the transfer means by reciprocating a rod through a second barrel cam located below the table, and converting the reciprocal motion of the rod through a lever to the transfer means. The invention is most advantageously used in an indexing machine wherein the worktable, indexing and locking mechanism and both barrel cams are on one shaft; the shaft must, in addition to indexing the table, be designed to carry the transfer means and the mechanisms which carry, reciprocate and oscillate the transfer means. When I do not mount the cams on the shaft indexing the worktable, I prefer to operate and support the transfer means and its associated mechanism by cams supported upon a horizontal shaft. Also, it should be apparent that the machine designer may choose not to rotate the worktable but to support the articles by a rotatable turret and that such a choice is merely a matter of preference, and would be one of several forms of my invention.

Other details objects and advantages of the invention will become apparent as the following description of a present preferred embodiment proceeds.

In the accompanying drawings, I have schematically shown a present preferred embodiment of the invention in which.

Figure 1:
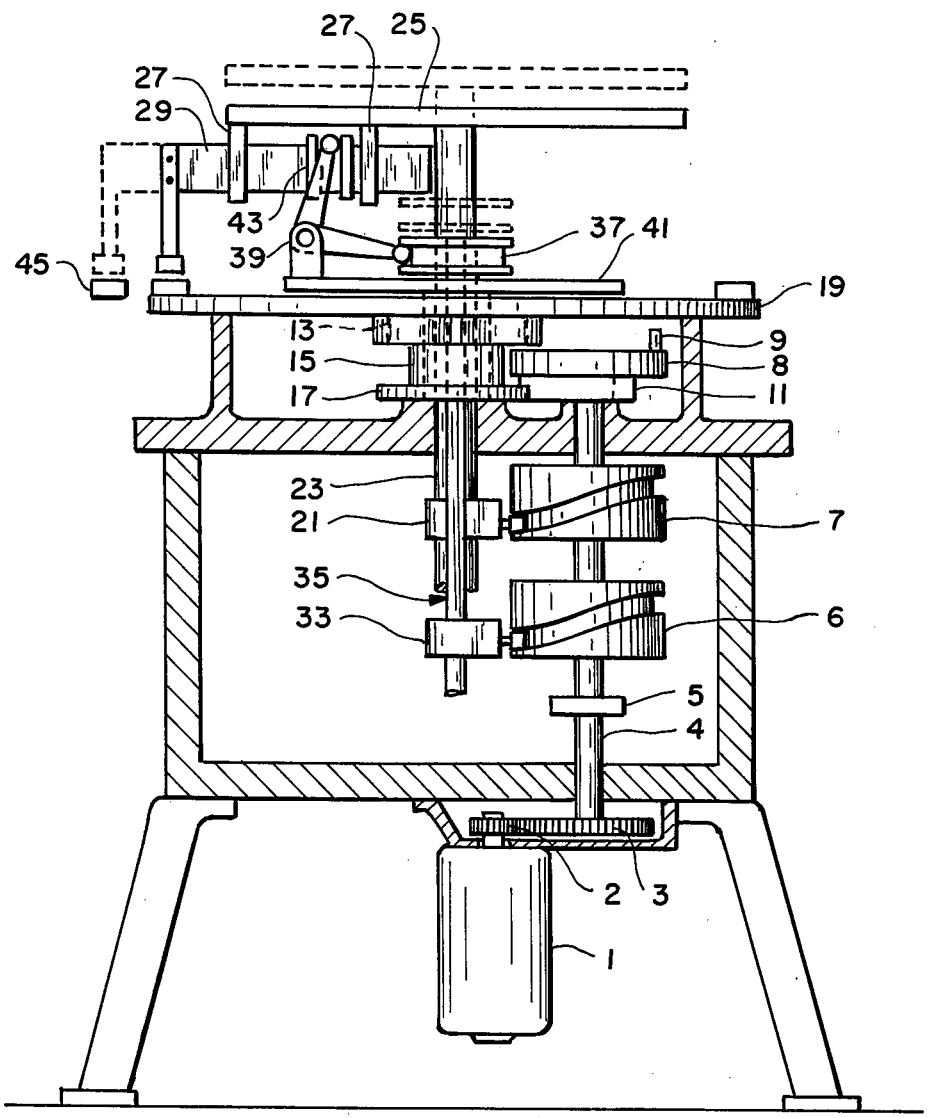
FIG. 1 is a schematic representation depicting an elevation of welding machine characterized by the improvement claimed.

Referring to FIG. 1, motor 1 drives gears 2, 3 to rotate shaft 4 on which are wheel operator 8, first or reciprocal movement cam 7, a second or oscillatory movement cam 6, a welding electrode cam (not shown) and a sprocket 5 driving a conventional programmer (not shown) controlling the various mechanical operations.

Figure 3:
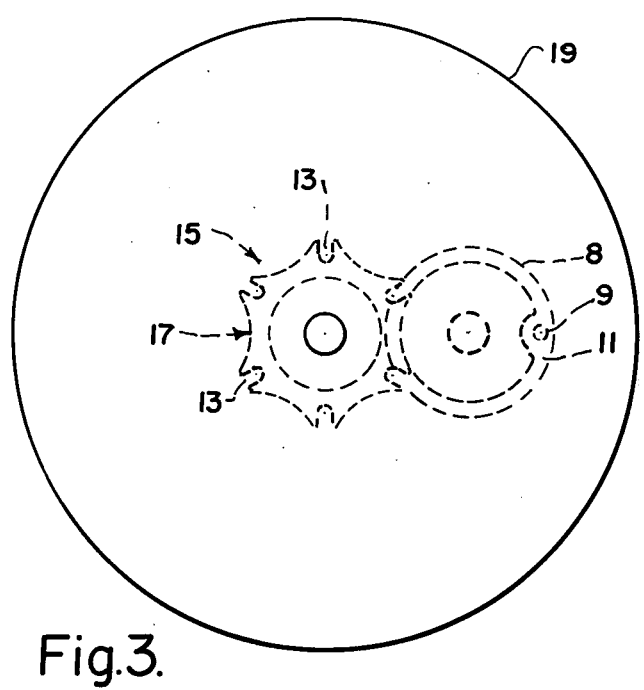
FIG. 3 is a schematic representation depicting a plan view of the geneva gear assembly.

As most clearly seen in FIG. 1 and FIG. 3, wheel operator 8 is part of a geneva-type system which indexes and locks the rotational movement of worktable 19. Briefly, this system, which is well known and only one of many possible drives, includes pin 9 on wheel operator 8 which engages slots 13 on wheel 15 to index worktable 19. Cut-a-way portion 11 from wheel operator 8, allow worktable 19 and wheel 15 to index, when pin 9 is engaged. When pin 9 is not engaged, wheel operator 8 locks worktable 19 by meshing with wheel 15 at recess 17.

Reciprocal movement cam 7 cooperates with cam follower 21 fastened to center shaft 23 to reciprocate any carrier such as tool plate 25, transfer means supports 27, 27 and transfer means 29.

Oscillatory movement cam 6 cooperates with cam follower 33 fastened to rods 35 to reciprocate collar 37 fastened on shafts 35. I prefer to support collar 37 with two rods rather than one to strengthen the assembly. I also spring bias (not shown) rods 35 and center shaft 23 to urge cam followers 21 and 33 against the cam races. Bell crank lever 39 is pivotally supported by stationary plate 41 and communicates the reciprocal movement of collar 37 to collar 43 fastened to transfer means 29.

Figure 2:
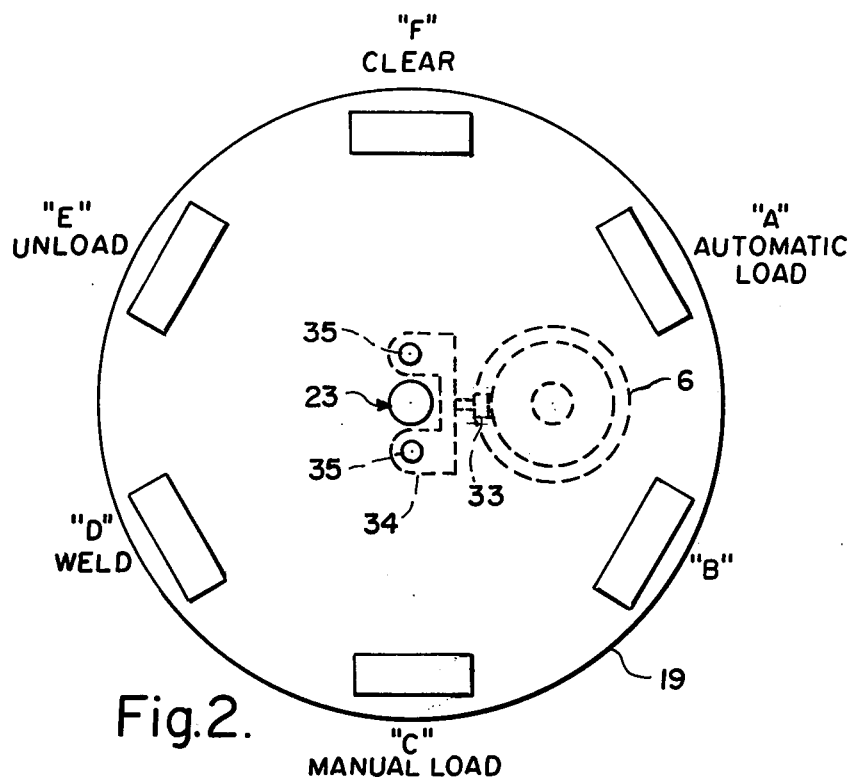
FIG. 2 is a schematic representation depicting a plan view of the worktable and work stations.
Figure 4:
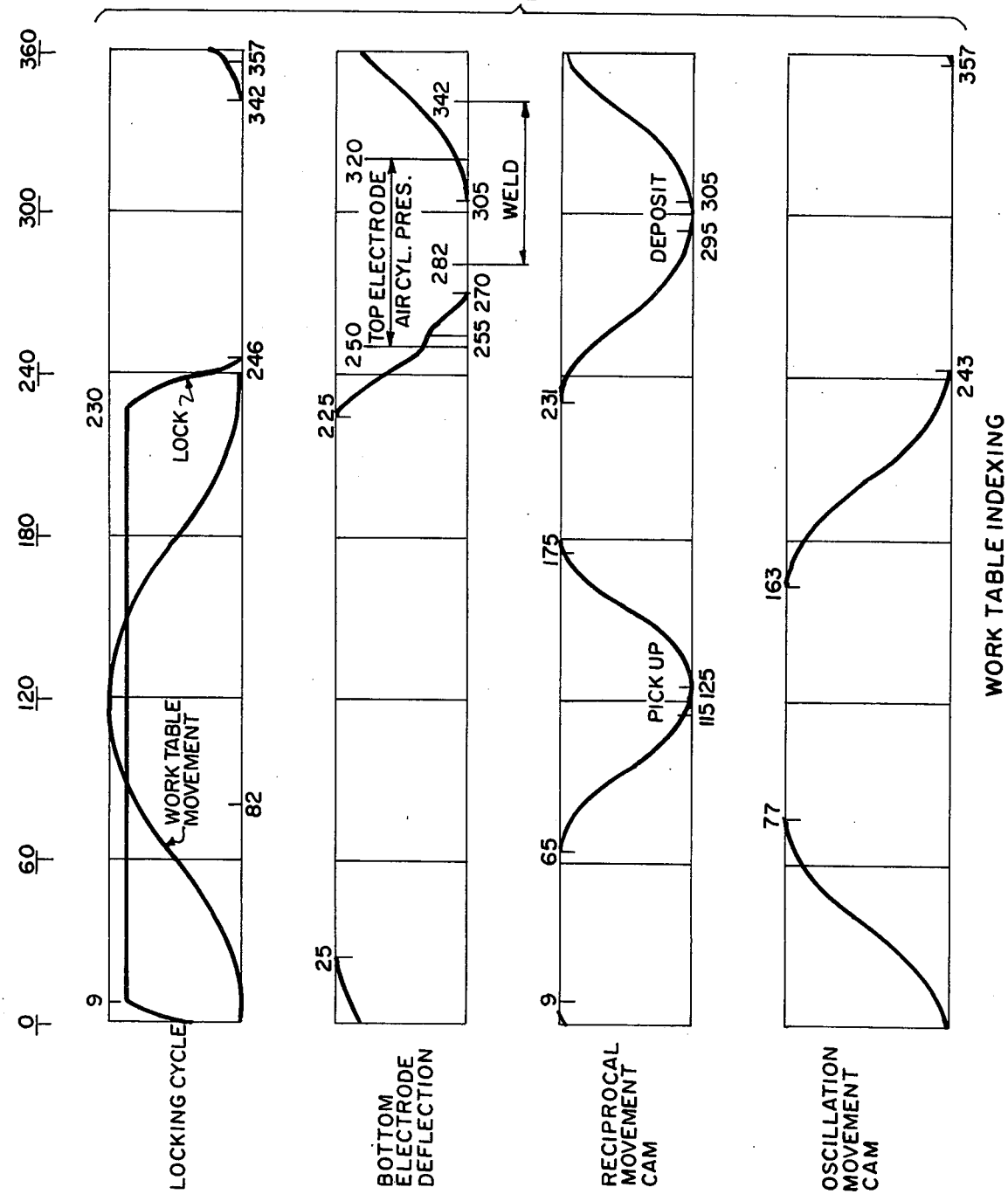
FIG. 4 is a graph illustrating the cam cycles.

The specific purpose of my preferred embodiment is to weld articles, such as two small metal plates, together. FIG. 2 schematically depicts the work stations on worktable 19, where various mechanical operations occur. At work station A a first plate 45 on another machine is to be automatically picked up by transfer means 29 oscillating between the pick up point and the jig on the worktable, the placing point. A typical cycle for such oscillation is indicated in FIG. 4 which shows the cycle of oscillation movement cam 6. Cam 6 imparts reciprocal motion through cam follower 33 and rods 35 to collar 37. The movement of collar 37 pivots bell crank lever 39 to urge collar 43 fastened to transfer means 29 between two points. Vertical movement of transfer means 29 allows plate 45 to be approached from above or below. A typical cycle for the reciprocal movement is indicated in FIG. 4, which represent the cycle of reciprocal movement cam 7. Cam 7 imparts reciprocal movement through cam follower 21, center shaft 23, tool plate 25, transfer means supports 27, 27 to transfer means 29. In my preferred embodiment, the reciprocal and oscillatory actions combine to permit an infinite variations of movements of transfer means 29 to be realized. There can also be several transfer means like 29 connected together to pick up large pieces or several such transfer means simultaneously operating on several small pieces. The mechanism is simplified because of the several transfer means are supported and actuated through the movements of collar 37 and carrier 25.

The movement of transfer means 29 is timed with the movement of worktable 19 by the geneva-gear system briefly discussed above. The Worktable Indexing & Locking Cycle indicated in FIG. 4 shows the cycle for wheel 8. After first plate 45 is placed in the jig on turntable 19 and the transfer means is clear, the geneva-gear system advances first plate 45 to work station B and then locks turntable 19. While turntable 19 is locked, various mechanical operations may occur at other work stations; another first plate is placed in a jig at work station A by transfer means 29, and other operations hereinafter described occur simultaneously at work stations C through F. In my preferred embodiment, work station B is not utilized.

The geneva-gear system then advances first plate 45 to work station C and locks turntable 19 while a second plate (not shown) is manually placed on first plate 45. Next first plate is advanced to work station D and turntable 19 is locked. Here the two pieces are welded together by any conventional apparatus; I prefer to actuate a bottom electrode through linkages within the periphery of turntable 19 by a welding electrode barrel cam (not shown) mounted on shaft 4, and to actuate a top electrode and to weld by a programmer (not shown) driven by sprocket 5 mounted on shaft 4. After being welded together, the plates are advanced to work station E where they are ejected by an air blast actuated by the programmer (not shown) driven by sprocket 5. According to my invention, one or moe transfer means like that operating at work station A could be used to pick up the plates and transfer them beyond the periphery of worktable 19. The empty jig is advanced to work station F where an air blast controlled by the programmer clears the jig of any material which may interfere with subsequent cycles. Finally, the geneva-gear system advances the empty jig to work station A and another cycle begins.

Figure 5:
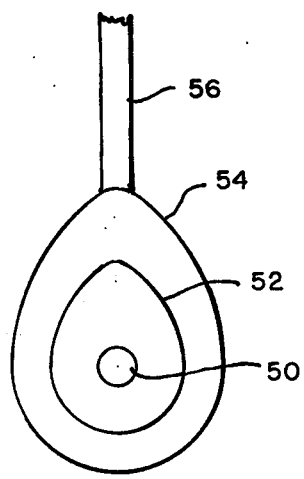
FIG. 5 is a schematic representation of a horizontally mounted cam.

FIG. 5 schematizes the projecting and oscillating mechanism in an indexing machine having a horizontal drive shaft 50 in place of vertical shaft 4. A horizontally mounted motor (not shown) drives shaft 50 and cams 52 and 54 mounted thereon. Shaft 50 drives the Geneva gear mechanism mounted on shaft 56 through a right angle drive (not shown) as well as the mechanism following cams 52 and 54. Cam follower 32 joined to rod 35 (FIG. 1) is in operative with cam 52 to project transfer means 29 beyond the periphery of worktable 19. similarly cam follower 21 joined to center shaft 23 (FIG. 1) is in operative relation with cam 54 to reciprocate transfer means 29.

While I have shown and described a present preferred embodiment of the invention, it is to be distinctly understood that the invention is not limited, thereto, but may be otherwise variously embodied within the scope of the following claims.

I claim:

1. In combination with an indexing machine of the type wherein various mechanical operations are performed on articles at workstations about a worktable rotatable about a center, the improvement which comprises:
   a. a transfer means for picking up and placing the articles on the worktable;
   b. a support means mounted on the indexing machine and in operative engagement with a drive shaft below the worktable for operation within the periphery of the worktable and penetrating the plane of the worktable for reciprocating the transfer means; and
   c. a projection means mounted on the indexing machine in operative engagement with a drive shaft below the worktable for operation within the periphery of the worktable and penetrating the plane of the worktable within the periphery of the worktable for oscillating the transfer means between a first point beyond the periphery of the worktable and a second point within the periphery of the worktable, whereby the reciprocating action of the support means and the oscillating action of the projection means combine with the pickup action of the transfer means.

2. The improvement described in claim 1, wherein the support means comprises a drive shaft disposed perpendicularly to the worktable, a barrel cam mounted on the drive shaft, a center shaft mounted coaxially with the worktable, a cam follower fastened to the center shaft in operative relation with the barrel cam, fastened to the center shaft a tool plate, and a carrying means supported by the tool plate to hold the transfer means, whereby the rotation of the drive shaft reciprocates the transfer means.

3. The improvement described in claim 1, wherein the projection means comprises a drive shaft disposed perpendicularly to the worktable, a barrel cam mounted on the drive shaft, a rod mounted perpendicular to the worktable, a cam follower fastened to the rod in operative relation with the barrel cam, a collar mounted to the rod above the worktable, a lever in operative cooperation with the collar mounted on the rod, and a collar on the transfer means operatively cooperating with the lever whereby the rotation of the drive shaft oscillates the transfer means between a first point beyond the periphery of the worktable and a second point within the periphery of the worktable.

4. The improvement of claim 1, wherein the support means comprises a drive shaft disposed perpendicularly to the worktable, a first barrel cam mounted on the drive shaft, a center shaft mounted coaxially with the worktable, a cam follower fastened to the center shaft in operative relationship with the first barrel cam, a tool plate fastened to the center shaft above the worktable, and a carrying means supported by the tool plate to hold the transfer means for reciprocating the transfer means, and the projection means comprises a second barrel cam mounted on the drive shaft, a rod mounted perpendicularly to the worktable, a cam follower fastened to the rod in operative relation with the second cam, a collar mounted to the rod above the worktable, a stationary plate disposed between the collar mounted on the rod and the worktable, a bell crank lever pivotally supported by the stationary plate having a first arm operatively connected to the collar mounted on the rod, and a collar on the transfer means operatively connected to the second arm of the bell crank lever for oscillating the transfer means between a first point beyond the periphery of the worktable and a second point within the periphery of the worktable, whereby the rotation of the drive shaft reciprocates and oscillates the transfer means.

5. The improvement described in claim 1, wherein the support means comprises a drive shaft disposed parallel to the plane of the worktable, a cam mounted on the drive shaft, a center shaft mounted coaxially with the worktable, a cam follower joined to the center shaft in operative relation with the cam, fastened to the center shaft a tool plate, and a carrying means supported by the tool plate to hold the transfer means, whereby the rotation of the drive shaft reciprocates the transfer means.

6. The improvement described in claim 1, wherein the projection means comprises a drive shaft disposed parallel to the plane of the worktable, a cam mounted on the drive shaft, a rod mounted perpendicular to the worktable, a cam follower joined to the rod in operative relation with the cam, a collar mounted to the rod above the worktable, a lever in operative cooperation with the collar mounted on the rod, and a collar on the transfer means operatively cooperating with the lever whereby the rotation of the drive shaft oscillates the transfer means between a first point beyond the periphery of the worktable and a second point within the periphery of the worktable.

7. The improvement of claim 1, wherein the support means comprises a drive shaft disposed parallel to the plane of the worktable, a first cam mounted on the drive shaft, a center shaft mounted coaxially with the worktable, a cam follower joined to the center shaft in operative relation with the first cam, fastened to the center shaft a tool plate, and a carrying means supported by the tool plate to hold the transfer means for reciprocating the transfer means, and the projection means comprises a second cam mounted on the drive shaft, a rod mounted perpendicular to the worktable, a cam follower joined to the rod in operative relation with the second cam, a collar mounted to the rod above the worktable, a lever in operative cooperation with the collar mounted on the rod, and a collar on the transfer means operatively cooperating with the lever, whereby the rotation of the drive shaft reciprocates and oscillates the transfer means.

* * * * *